US012005446B2

(12) United States Patent
Sowwan et al.

(10) Patent No.: US 12,005,446 B2
(45) Date of Patent: Jun. 11, 2024

(54) HIGH THROUGHPUT COMPACT MICROFLUIDIC CELL COUNTER

(71) Applicant: APPLIED MATERIALS, INC., Santa Clara, CA (US)

(72) Inventors: Mukhles Sowwan, Cupertino, CA (US); Samer Banna, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 84 days.

(21) Appl. No.: 17/505,628

(22) Filed: Oct. 20, 2021

(65) Prior Publication Data

US 2022/0126291 A1    Apr. 28, 2022

Related U.S. Application Data

(60) Provisional application No. 63/104,801, filed on Oct. 23, 2020.

(51) Int. Cl.
*B01L 3/00* (2006.01)
*G01N 15/10* (2024.01)
*G01N 15/1031* (2024.01)

(52) U.S. Cl.
CPC .... *B01L 3/502715* (2013.01); *G01N 15/1031* (2013.01); *B01L 2300/0645* (2013.01); *B01L 2300/0858* (2013.01); *B01L 2300/0864* (2013.01)

(58) Field of Classification Search
CPC ...... G01N 17/02; G01N 17/006; G01N 27/02; G01N 17/043; G01N 21/00; G01N 23/00; C23F 13/22
See application file for complete search history.

(56) References Cited

U.S. PATENT DOCUMENTS

| 9,808,802 B2 | 11/2017 | Dothie et al. |
| 9,821,310 B2 | 11/2017 | Guldiken et al. |
| 2003/0102854 A1 | 6/2003 | Gascoyne et al. |
| (Continued) | | |

FOREIGN PATENT DOCUMENTS

WO    WO 2009/147486 A2    12/2009

OTHER PUBLICATIONS

Math is Fun (Year: 2018).*

(Continued)

*Primary Examiner* — Jill A Warden
*Assistant Examiner* — Michael Stanley Gzybowski
(74) *Attorney, Agent, or Firm* — MOSER TABOADA

(57) ABSTRACT

Embodiments of apparatus and methods for counting cells in a liquid sample are provided herein. In some embodiments, an apparatus for counting cells in a liquid sample includes: a flow-splitting chamber fluidly coupled to a collection chamber; an input tube configured to deliver a liquid sample to the flow-splitting chamber; a spaced apart array of posts along a flow path configured to redirect the liquid sample into a plurality of streams; a plurality of sensing zones corresponding to the plurality of streams; and a plurality of sensing electrodes, wherein each sensing electrode is disposed in a corresponding sensing zone of the plurality of sensing zones and configured to detect a change in electrical impedance as the liquid sample flows through the plurality of sensing zones.

15 Claims, 3 Drawing Sheets

(56) References Cited

U.S. PATENT DOCUMENTS

| | | | |
|---|---|---|---|
| 2004/0144651 A1* | 7/2004 | Huang | G01N 27/44773 |
| | | | 204/601 |
| 2014/0227777 A1 | 8/2014 | Choi et al. | |
| 2017/0248512 A1 | 8/2017 | Di Carlo et al. | |
| 2019/0039060 A1* | 2/2019 | Chien | B01L 3/502715 |
| 2022/0034780 A1 | 2/2022 | Swami et al. | |

OTHER PUBLICATIONS

Zhe et al. A micromachined high throughput Coulter counter for bioparticle detection and counting. Journal of Micromechanics and Microengineering. 17(2007),304-313. https://iopscience.iop.org/article/10.1088/0960-1317/17/2/017.

Y Wu et al . MEMS-based Coulter counter for cell counting and sizing using multiple electrodes. Journal of Micromechanics and Microengineering. 20 (2010) 085035. https://iopscience.iop.org/article/10.1088/0960-1317/20/8/085035.

M. Cuolucccio et al . Microfluidic Platforms for cell cultures and investigations. Microelectronic engineering 208 (2019),14-28. https://www.sciencedirect.com/science/article/pii/S016793171930019X.

Sobahi, N. et al., "High-throughput and label-free multi-outlet cell counting using a single pair of impedance electrodes", Biosensors and Bioelectronics, Jul. 17, 2020 (Online published), vol. 166, Article No. 112458, internal pp. 1-8.

* cited by examiner

HIGH THROUGHPUT COMPACT MICROFLUIDIC CELL COUNTER

CROSS-REFERENCE TO RELATED APPLICATIONS

This application claims benefit of U.S. provisional patent application Ser. No. 63/104,801, filed Oct. 23, 2020, which is herein incorporated by reference in its entirety.

FIELD

Embodiments of the present disclosure generally relate to cell diagnostic equipment, and more specifically, equipment for detecting, counting, and sizing cells.

BACKGROUND

Counting and sizing bioparticles such as T cells and stem cells is very important for cell therapy manufacturing and many other biomedical applications. Such counting and sizing may be done using a Coulter counter system where an electrolyte containing the cells is pumped through an aperture separating two chambers, and the electrical impedance across the aperture is measured. When the cell passes through the aperture, the measured impedance changes, which can be correlated to size, shape, quantity, or concentration of cells. For cell therapy manufacturing, close monitoring of cell quantities and size is important during and after each step in the manufacturing process. However, conventional Coulter counter systems are slow, bulky, expensive, and not suitable for in line integration into cell therapy manufacturing platforms.

Accordingly, the inventors have provided improved methods and apparatus for counting and sizing bioparticles.

SUMMARY

Embodiments of apparatus and methods for counting cells in a liquid sample are provided herein. In some embodiments, an apparatus for counting cells in a liquid sample includes: a flow-splitting chamber fluidly coupled to a collection chamber; an input tube configured to deliver a liquid sample to the flow-splitting chamber; a spaced apart array of posts along a flow path configured to redirect the liquid sample into a plurality of streams; a plurality of sensing zones corresponding to the plurality of streams; and a plurality of sensing electrodes, wherein each sensing electrode is disposed in a corresponding sensing zone of the plurality of sensing zones and configured to detect a change in electrical impedance as the liquid sample flows through the plurality of sensing zones.

In some embodiments, a cell manufacturing apparatus includes: a master device having a controller for processing control programs; and a cell counting device electrically coupled to the master device to facilitate transfer of data therebetween and fluidly coupled to the master device, wherein the cell counting device comprises: a flow-splitting chamber fluidly coupled to a collection chamber, wherein at least one of the flow-splitting chamber and the collection chamber are fluidly coupled to the master device, wherein the flow-splitting chamber includes a spaced apart array of posts along a flow stream configured to redirect the liquid sample into a plurality of streams; a plurality of sensing zones corresponding to the plurality of streams; a first electrode electrically coupled to the flow-splitting chamber; a second electrode electrically coupled to the collection chamber; and a plurality of sensing electrodes, wherein each sensing electrode is disposed in a corresponding sensing zone of the plurality of sensing zones and configured to detect a change in electrical impedance as the liquid sample flows through the plurality of sensing zones.

In some embodiments, a method for counting cells in a liquid sample includes: flowing a liquid sample to a flow-splitting chamber fluidly of a cell counting device coupled to a collection chamber; dividing the liquid sample flowing through the flow-splitting chamber into a plurality of streams using a spaced apart array of posts disposed in the flow-splitting chamber along a flow stream of the liquid sample; flowing the liquid sample from the plurality of streams through a corresponding plurality of sensing zones disposed between the flow-splitting chamber and the collection chamber; and determining at least one of a cell count, cell morphology, or cell size of cells of the liquid sample by using sensing electrodes disposed in each sensing zone of the plurality of sensing zones to detect a change in electrical impedance as the liquid sample flows through the plurality of sensing zones.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
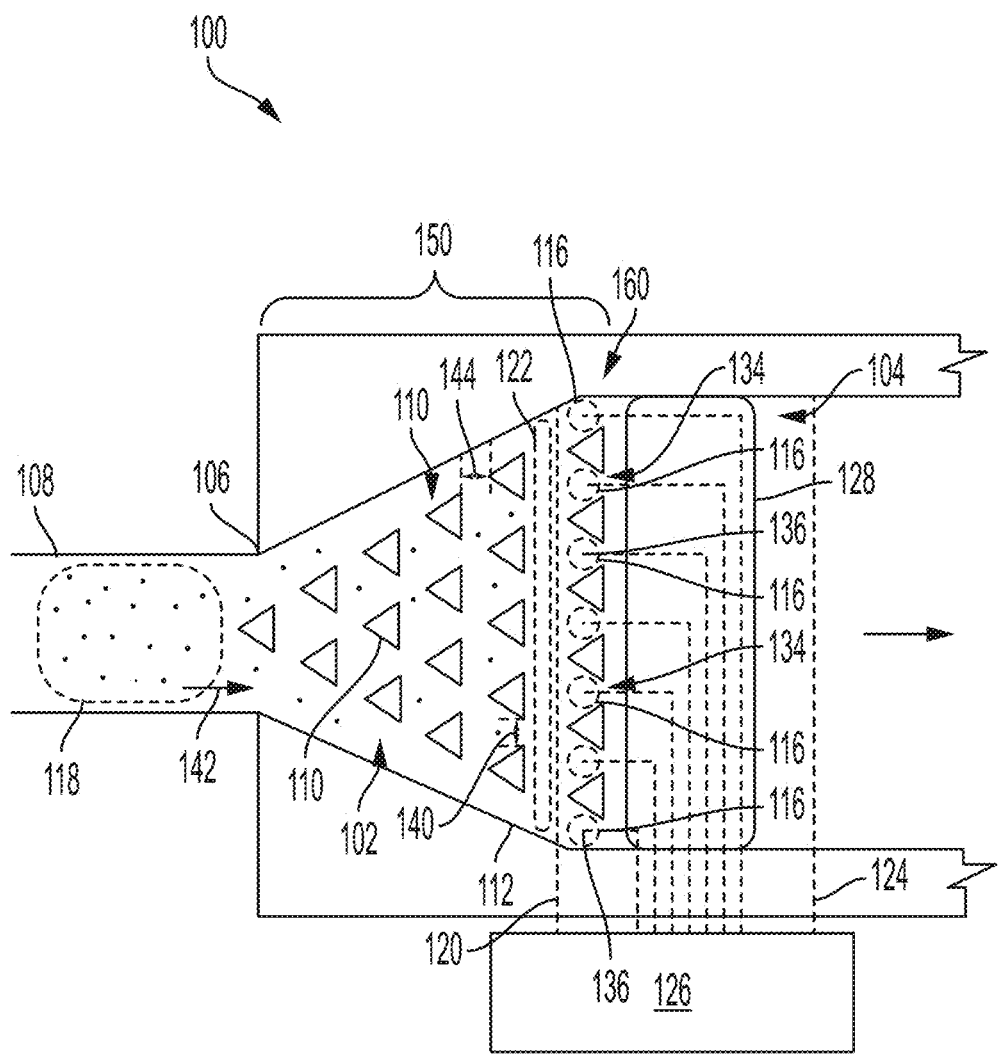
FIG. 1 is a schematic top view of an apparatus to count cells in accordance with some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of cell counter devices that are compact and provide a high throughput are provided herein. The cell counter devices are configured to measure at least one of a quantity, size, concentration, or shape (i.e., morphology) of cells. The cell counter devices provided herein advantageously improve throughput by separating a stream of a liquid sample into a plurality of streams using a spaced apart array of posts. Each of the plurality of streams correspond with a sensing zone. Sensing electrodes are disposed in each sensing zone to measure a variation in electrical impedance as cells pass through each sensing zone. The measured variation in electrical impedance provides at least one of a quantity, size, concentration, or shape of the cells that pass through each of the sensing zones. The posts of the spaced apart array of posts that define the plurality of streams advantageously reduce or prevent electrical crosstalk between sensing zones.

FIG. 1 is a schematic top view of an apparatus to count cells in accordance with some embodiments of the present disclosure. An apparatus for counting cells in a liquid sample includes a cell counting device 100 having a flow-splitting chamber 102 fluidly coupled to a collection chamber 104. The flow-splitting chamber 102 is fluidly coupled to an input tube 108 at an inlet 106 of the flow-splitting chamber. The input tube 108 may be a microfluidic channel or another suitable conduit for liquid delivery. The input tube 108 of the cell counting device 100 is configured to deliver the liquid sample to the flow-splitting chamber 102. In some embodiments, the flow-splitting chamber 102 includes sidewalls 112 that taper radially outward from the inlet 106 towards the collection chamber 104.

The flow-splitting chamber 102 includes a spaced apart array of posts 110 along a flow path 142 that extends from the inlet 106 to towards the collection chamber 104. The spaced apart array of posts 110 are configured to redirect or separate an initial stream 118 of the liquid sample into a plurality of streams 122. Each post of the spaced apart array of posts 110 may have a suitable shape for redirecting or separating the initial stream 118 into the plurality of streams 122. In some embodiments, the spaced apart array of posts 110 have a triangular or circular cross-sectional shape. The spaced apart array of posts 110 may have any other suitable cross-sectional geometry, such as rounded rectangular shaped, diamond shaped, hexagon shaped, or the like.

Figure 2:
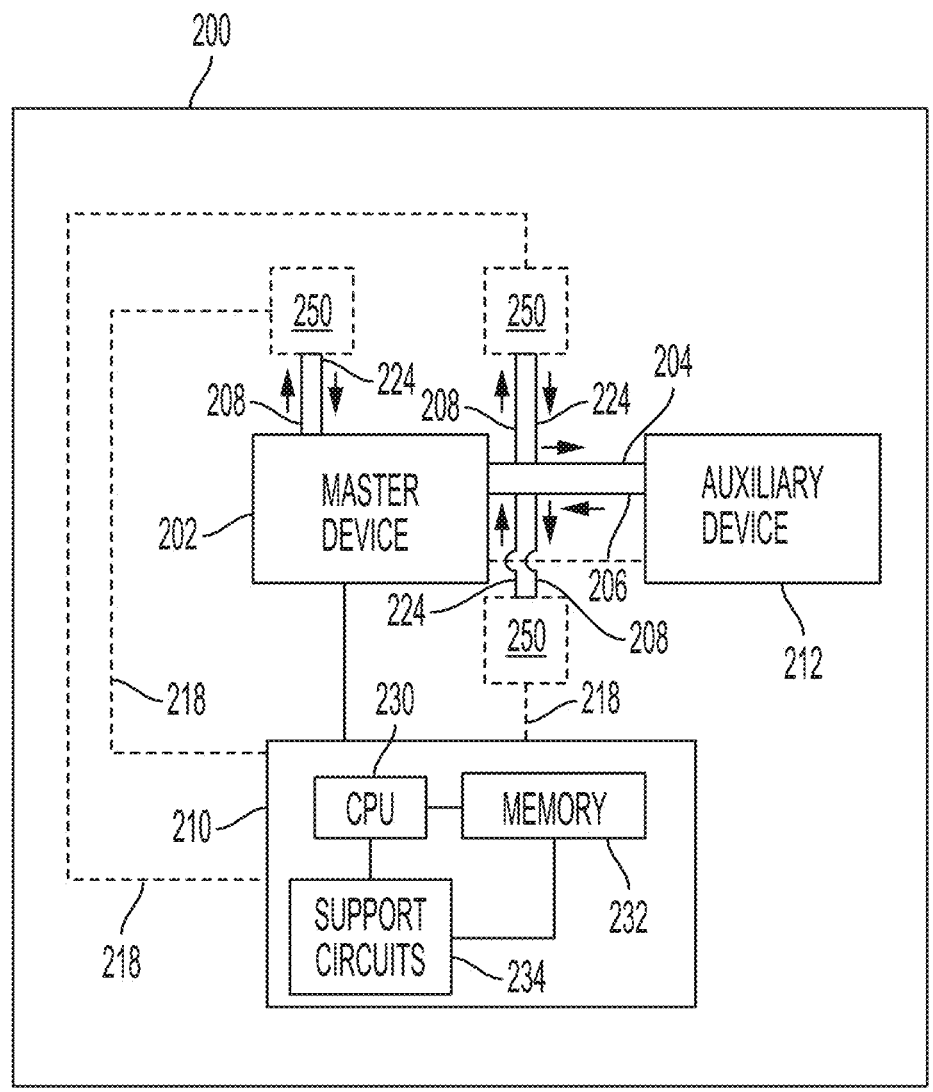
FIG. 2 depicts a cell manufacturing apparatus having one or more cell counting devices in accordance with some embodiments of the present disclosure.

In some embodiments, the spaced apart array of posts 110 are arranged in a plurality of rows 150 between the inlet 106 and the collection chamber 104. In some embodiments, from the inlet 106 to the collection chamber 104, each row of the plurality of rows 150 includes a greater number of posts of the spaced apart array of posts 110 than any preceding row of the plurality of rows 150. While FIG. 2 depicts the spaced apart array of posts 110 arranged in six rows, the plurality of rows 150 may comprise "n" number of rows.

A size of the posts of the spaced apart array of posts 110, a first gap 140 between two lateral posts of the spaced apart array of posts 110, and a second gap 144 between two adjacent posts of the spaced apart array of posts 110 along the flow path 142 may be optimized for different types of cells. For example, the first gap 140 between two lateral posts of the spaced apart array of posts 110 may be about 20 to about 100 microns. In some embodiments, the first gap 140 may be uniform between posts of the spaced apart array of posts 110. In some embodiments, the first gap 140 may vary between posts of the spaced apart array of posts 110. In some embodiments, the first gap 140 may be uniform between posts in a same row of the plurality of rows 150 and may vary from different rows of the plurality of rows 150.

In some embodiments, the second gap 144 between two posts of the spaced apart array of posts 110 along a flow path may be about 20 to about 100 microns. In some embodiments, the second gap 144 may be uniform between posts of the spaced apart array of posts 110. In some embodiments, the second gap 144 may vary between posts of the spaced apart array of posts 110.

In some embodiments, a width of each post of the spaced apart array of posts 110 may be about 5 to about 50 microns in width. In some embodiments, each post of the plurality of posts 110 has a similar size. In some embodiments, the plurality of posts 110 have sizes that vary. For example, posts of the plurality posts 110 proximate the inlet 106 may have a size greater than posts of the plurality of posts 110 proximate the collection chamber 104.

The initial stream 118 separating into the plurality of streams 122 advantageously minimizes coincidence and clogging. Coincidence is generally described as when two cells, or particles, are counted as one larger cell, resulting in a false cell count or false cell size characterization. Clogging occurs when two cells or more pile up at a sensing zone, resulting in false cell count, false cell size characterization, or reduction in throughput. In some embodiments, the plurality of streams 122 extend in substantially parallel streams. In some embodiments, each of the plurality of streams have a width of about 20 to about 100 microns. In some embodiments, each of the plurality of streams have a height of about 20 to about 100 microns.

Posts of the spaced apart array of posts 110 disposed in a last row 160 of the plurality of rows 150 define a plurality of channels 134 therebetween. The last row 160 may also define an interface between the flow-splitting chamber 102 and the collection chamber 104. The number of streams of the plurality of streams 122 generally have a 1:1 correlation with the number of channels of the plurality of channels 134. The last row 160 may be the row of the plurality of rows 150 nearest the collection chamber 104. In some embodiments, a number of streams of the plurality of streams 122 corresponds with a number of posts of the spaced apart array of posts 110 disposed in the last row 160 of the plurality of rows 150. For example, when the last row 160 comprises an "n" number of posts defining "n+1" channels of the plurality of channels 134, the plurality of streams 122 comprises an "n+1" number of streams configured to flow through the "n+1" channels. In some embodiments, a number of the plurality of streams 122 corresponds with the number of rows 150. For example, when the number or rows 150 comprises "n" number of rows, the plurality of streams 122 may comprise an "n+1" number of streams that may flow through an "n+1" number of channels of the plurality of channels 134.

A first electrode 120 is electrically coupled to the flow-splitting chamber 102. In some embodiments, the first electrode 120 is disposed in the flow-splitting chamber 102 proximate the last row 160 and extends across the plurality of streams 122. In some embodiments, the first electrode 120 is disposed substantially parallel to the last row 160 or substantially perpendicular to the flow path 142. In some embodiments, the first electrode 120 extends along an entrance of each channel of the plurality of channels 134. A second electrode 124 is electrically coupled to the collection chamber 104 downstream of the spaced apart array of posts 110. In some embodiments, the second electrode 124 is grounded. In some embodiments, an insulating layer 128 is disposed between the first electrode 120 and the second electrode 124. In some embodiments, the insulating layer 128 is disposed in the collection chamber 104.

A plurality of sensing zones 116 correspond to the plurality of streams 122. In some embodiments, the plurality of sensing zones 116 are disposed in the flow-splitting chamber 102 proximate the collection chamber 104. In some embodiments, the plurality of sensing zones 116 are disposed between the flow-splitting chamber 102 and the collection chamber 104. Each sensing zone 116 is generally disposed in a corresponding channel of the plurality of channels 134. A sensing electrode 136 is disposed in each sensing zone of the plurality of sensing zones 116 and is configured to detect a change in electrical impedance as the liquid sample flows through the plurality of sensing zones 116. An electronics module 126 may electrically couple the sensing electrodes 136, the first electrode 120, and the second electrode 124 to facilitate detecting the change in electrical impedance at each sensing zone. The electronics module 126 may include a power source such as a dc power supply coupled to the first electrode 120.

In use, the initial stream 118 of a liquid sample enters the flow-splitting chamber 102 via the input tube 108. The spaced apart array of posts 110 arranged in a plurality of rows direct the initial stream 118 into a plurality of streams 122. The plurality of streams 122 pass through the plurality of sensing zones 116. When cells from the liquid sample pass through the plurality of sensing zones 116, the sensing electrode 136 associated with each sensing zone detects a change in electrical impedance from a baseline impedance established between the first electrode 120 and the second electrode 124 as the liquid sample flows through the plurality of sensing zones 116. Each sensing electrode 136 is exposed to portions of the liquid sample passing through a corresponding sensing zone, reducing crosstalk between sensing electrodes 136. All of the sensing electrodes 136 can detect cells simultaneously, enabling higher throughput.

FIG. 2 depicts a cell manufacturing apparatus 200 having one or more cell counting devices 250 in accordance with some embodiments of the present disclosure. A compact design of a cell counting device 250 provided herein may advantageously be integrated with upstream and downstream process steps in the cell manufacturing apparatus 200 to perform a cell measurement, for example, to perform a measurement of at least one of a quantity, size, concentration, or shape of cells. In some embodiments, the cell counting device 250 is the cell counting device 100. The cell manufacturing apparatus 200 may generally include a master device 202 having a controller 210 for processing control programs. The master device 202 is electrically via conduit 218 coupled to the cell counting device 250 to facilitate transfer of data therebetween. For example, data regarding the quantity, size, shape, or the like, of cells in a liquid sample flowed through the cell counting device 250 may be transferred to the master device 202.

The master device 202 is fluidly coupled to the cell counting device 250 to transfer the liquid sample therebetween. The liquid sample may flow to the cell counting device 250 via an input tube 208. In some embodiments, the input tube 208 may be input tube 108. The liquid sample may flow out from the cell counting device 250 via an output tube 224. The output tube 224 is fluidly coupled to the collection chamber 104. In some embodiments, the liquid sample may flow from the master device 202 to the flow-splitting chamber 102 of the cell counting device 250 via the input tube 208. In some embodiments, the liquid sample may flow from the collection chamber 104 of the cell counting device 250 back to the master device 202 via the output tube 224.

In some embodiments, an auxiliary device 212 is fluidly coupled to the master device 202. The auxiliary device 212 is configured to perform a cell manufacturing process on the liquid sample, such as clean the liquid sample, perform a cell selection process on the liquid sample, perform a chemical enrichment process on the liquid sample, perform an activation, transduction, or transfection process on the liquid sample, or perform a cell multiplication process on the liquid sample. In some embodiments, an input tube 204 is configured to transfer the liquid sample from the master device 202 to the auxiliary device 212. In some embodiments, an output tube 206 is configured to transfer the liquid sample from the auxiliary device 212 to the master device 202.

In some embodiments, the cell counting device 250 is disposed in-line with the input tube 204 and configured to perform a measurement before the liquid sample is flowed to the auxiliary device 212. In such embodiments, the liquid sample flows from the master device 202 to the cell counting device 250 to the auxiliary device 212. In some embodiments, the cell counting device 250 is disposed in-line with the output tube 206 and configured to perform a measurement after the liquid sample is flowed to the auxiliary device 212. In such embodiments, the liquid sample flows from the auxiliary device 212 to the cell counting device 250 to the master device 202. As such, the cell manufacturing apparatus 200 advantageously provides a closed loop system of performing one or more cell manufacturing steps and performing one or more cell counting measurements.

The controller 210 generally controls the operation of the cell manufacturing apparatus 200 by controlling a flow of the liquid sample through varies devices and components of the cell manufacturing apparatus 200 via opening and closing of control valves. The controller 210 may control the one or more cell counting devices 250. The controller 210 may also control one or more cell manufacturing processes on the liquid sample performed via the auxiliary device 212. The controller 210 generally includes a central processing unit (CPU) 230, a memory 232, and a support circuit 234. The CPU 230 may be one of any form of a general-purpose computer processor that can be used in an industrial setting. The support circuit 234 is conventionally coupled to the CPU 230 and may comprise a cache, clock circuits, input/output subsystems, power supplies, and the like. Software routines, such as processing methods as described above may be stored in the memory 232 and, when executed by the CPU 230, transform the CPU 230 into a specific purpose computer (controller 210). The software routines may also be stored and/or executed by a second controller (not shown) that is associated with at least one of the cell counting device 250 or the auxiliary device 212.

In operation, the controller 210 enables data collection and feedback from the cell counting devices 250 and the auxiliary device 212 to optimize performance of the cell manufacturing apparatus 200 and provides instructions to system components. For example, the memory 232 can be a non-transitory computer readable storage medium having instructions that when executed by the CPU 230 (or controller 210) perform the methods described herein. For example, the controller 210 can collect data from the cell counting device 250 and instruct the cell manufacturing apparatus 200 to perform a suitable process via the auxiliary device 212.

Figure 3:
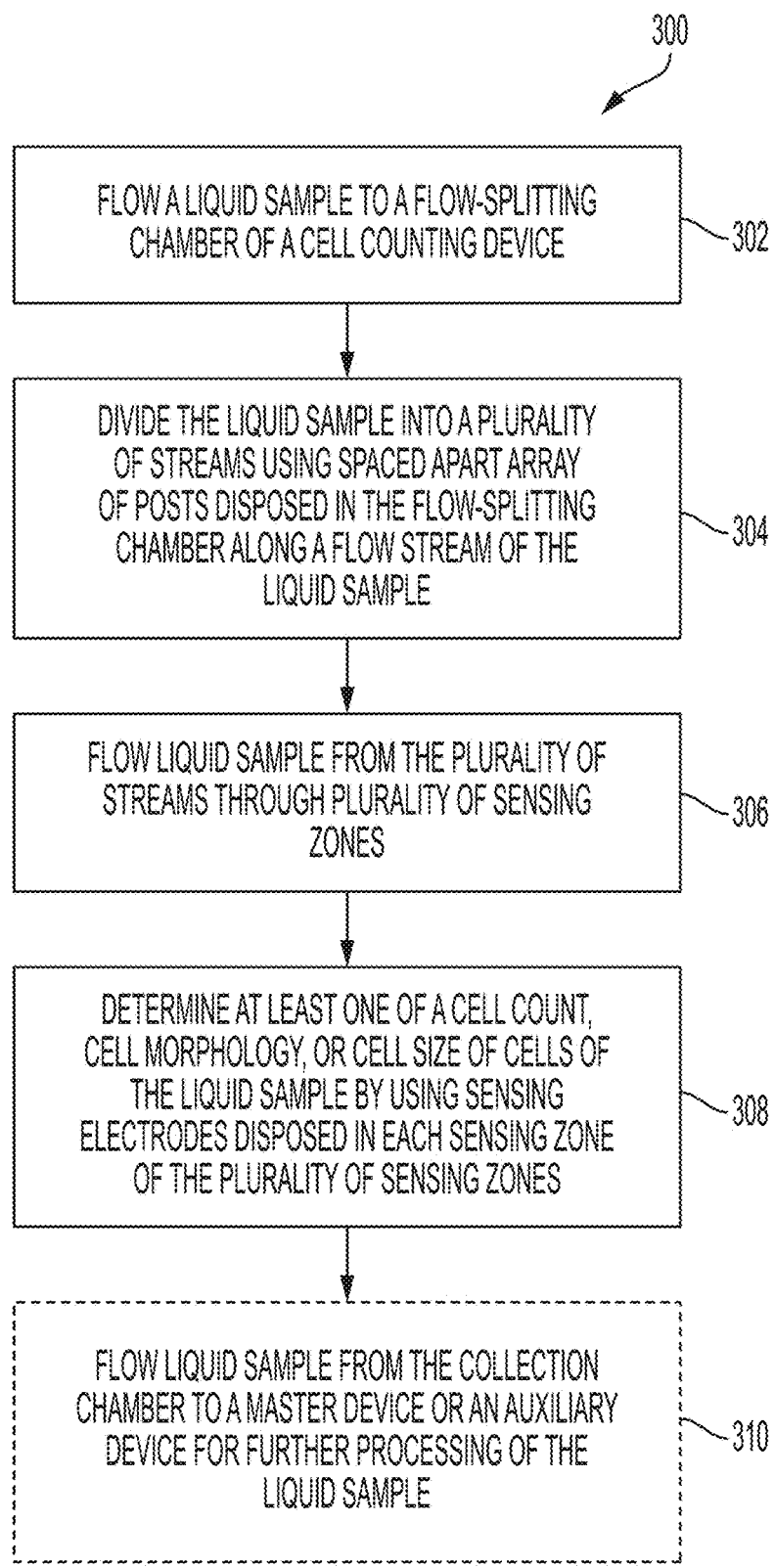
FIG. 3 depicts a method of counting cells in a liquid sample in accordance with some embodiments of the present disclosure.

FIG. 3 depicts a method 300 of counting cells in a liquid sample in accordance with some embodiments of the present disclosure. At 302, a liquid sample is flowed to a flow-splitting chamber (e.g., flow-splitting chamber 102) of a cell counting device (e.g., cell counting device 100). The flow-splitting chamber (e.g., flow-splitting chamber 102) is fluidly coupled to a collection chamber (e.g., collection chamber 104) of the cell counting device. The liquid sample may include bioparticles, such as T cells, stem cells, or the like.

At 304, the liquid sample is divided through the flow-splitting chamber into a plurality of streams (e.g., plurality of streams 122) using a spaced apart array of posts (e.g., spaced apart array of posts) disposed in the flow-splitting chamber along a flow path (e.g., flow path 142) of the liquid sample. The spaced apart array of posts may be arranged in a suitable pattern to form the plurality of streams. For example, the period array of posts may be arranged in a plurality of rows (e.g., plurality of rows 150), where each post bifurcates the liquid sample. The plurality streams may correspond with a number of posts of the spaced apart array of posts disposed at a last row (e.g., last row 160) of the plurality of rows.

At 306, the liquid sample is flowed from the plurality of streams through a corresponding plurality of sensing zones (e.g., plurality of sensing zones 116) disposed between the flow-splitting chamber and the collection chamber. The plurality streams may extend substantially parallel to each other.

At 308, at least one of a cell count, cell morphology, or cell size of the liquid sample is determined by using sensing electrodes (e.g., sensing electrodes 136) disposed in each sensing zone of the plurality of sensing zones to detect a change in electrical impedance as the liquid sample flows through the plurality of sensing zones.

Optionally, at 310, the liquid sample is flowed from the collection chamber to a master device (e.g., master device 202) or an auxiliary device (e.g., auxiliary device 212) for further processing of the liquid sample. In some embodiments, after flowing the liquid sample to the flow-splitting chamber, further processing comprises performing at least one cell manufacturing process. The at least one cell manufacturing process may comprise: a cleaning process on the liquid sample, a cell selection process on the liquid sample, a chemical enrichment process on the liquid sample, an activation, transduction, or transfection process on the liquid sample, or a cell multiplication process on the liquid sample.

In some embodiments, before flowing the liquid sample to the flow-splitting chamber, at least one cell manufacturing process is performed. The at least one cell manufacturing process may comprise one or more of: a cleaning process on the liquid sample, a cell selection process on the liquid sample, a chemical enrichment process on the liquid sample, an activation, transduction, or transfection process on the liquid sample, or a cell multiplication process on the liquid sample.

While the foregoing is directed to embodiments of the present disclosure, other and further embodiments of the disclosure may be devised without departing from the basic scope thereof.

The invention claimed is:

1. An apparatus for counting cells in a liquid sample, comprising:
a flow-splitting chamber fluidly coupled to a collection chamber;
an input tube configured to deliver a liquid sample containing cells to the flow-splitting chamber;
a spaced apart array of posts arranged in the flow-splitting chamber in a plurality of rows of posts along a flow path to define a plurality of channels therebetween and configured to redirect the liquid sample into a plurality of streams corresponding to the number of channels defined by a last row of posts in the plurality of rows of posts;
a plurality of sensing zones corresponding to the plurality of streams; and
a plurality of sensing electrodes, wherein each sensing electrode is disposed in a corresponding sensing zone of the plurality of sensing zones and configured to detect a change in electrical impedance as cells in the liquid sample flow through the plurality of sensing zones.

2. The apparatus of claim 1, wherein the flow-splitting chamber includes sidewalls that taper radially outward from the input tube towards the collection chamber.

3. The apparatus of claim 1, wherein the spaced apart array of posts have a triangular cross-sectional shape.

4. The apparatus of claim 1, wherein the spaced apart array of posts are arranged in a plurality of rows of posts, wherein from the input tube towards the collection chamber, each row of the plurality of rows of post includes a greater number of posts than any preceding row of the plurality of rows of posts.

5. The apparatus of claim 1, wherein the plurality of streams extend parallel to one another.

6. The apparatus of claim 1, wherein the spaced apart array of posts are arranged uniformly in the flow-splitting chamber.

7. The apparatus of claim 1, wherein each of the plurality of streams have a width of about 20 to about 50 microns.

8. The apparatus of claim 1, further comprising:
a first electrode electrically coupled to the flow-splitting chamber, wherein the first electrode is disposed between the last row of posts of the plurality of rows of posts and a second to last row of posts of the plurality of rows of posts; and
a second electrode electrically coupled to the collection chamber downstream of the plurality of rows of posts.

9. The apparatus of claim 8, further comprising an insulating layer disposed between the first electrode and the second electrode.

10. A cell manufacturing apparatus, comprising:
a master device having a controller for processing control programs; and
a cell counting device electrically coupled to the master device to facilitate transfer of data therebetween and fluidly coupled to the master device, wherein the cell counting device comprises:
a flow-splitting chamber fluidly coupled to a collection chamber, wherein at least one of the flow-splitting chamber and the collection chamber are fluidly coupled to the master device, wherein the flow-splitting chamber includes a spaced apart array of posts in the flow-splitting chamber along a flow path and configured to redirect a liquid sample containing cells into a plurality of streams, wherein the spaced apart array of posts are arranged uniformly in the flow-splitting chamber:
an input tube configured to deliver the liquid sample to the flow-splitting chamber;
a plurality of sensing zones corresponding to the plurality of streams;
a first electrode electrically coupled to the flow-splitting chamber;
a second electrode electrically coupled to the collection chamber; and
a plurality of sensing electrodes, wherein each sensing electrode is disposed in a corresponding sensing zone of the plurality of sensing zones and configured to detect a change in electrical impedance as the cells in the liquid sample flow through the plurality of sensing zones.

11. The cell manufacturing apparatus of claim 10, further comprising an input tube extending from the master device to the flow-splitting chamber for delivering the liquid sample from the master device to the flow-splitting chamber.

12. The cell manufacturing apparatus of claim 10, further comprising an auxiliary device fluidly coupled to the collection chamber, wherein the auxiliary device is configured to at least one of: clean the liquid sample; perform a cell selection process on the liquid sample; perform a chemical enrichment process on the liquid sample; perform an activation, transduction, or transfection process on the liquid sample; or perform a cell multiplication process on the liquid sample.

13. The cell manufacturing apparatus of claim 10, further comprising an output tube extending from the collection chamber to the master device for delivering the liquid sample from the collection chamber to the master device.

14. The cell manufacturing apparatus of claim 10, wherein each of the plurality of streams have a width of about 20 to about 50 microns.

15. An apparatus for counting cells in a liquid sample, comprising:
   a flow-splitting chamber fluidly coupled to a collection chamber;
   an input tube configured to deliver a liquid sample containing cells to the flow-splitting chamber; a spaced apart array of posts having a triangular cross sectional shape arranged in the flow-splitting chamber in a plurality of rows of posts along a flow path to define a plurality of channels therebetween and configured to redirect the liquid sample into a plurality of streams corresponding to the number of channels defined by a last row of posts in the plurality of rows of posts;
   a plurality of sensing zones corresponding to the plurality of streams;
   a plurality of sensing electrodes, wherein each sensing electrode is disposed in a corresponding sensing zone of the plurality of sensing zones and configured to detect a change in electrical impedance as the cells in the liquid sample flow through the plurality of sensing zones;
   a first electrode electrically coupled to the flow-splitting chamber, wherein the first electrode is disposed between the last row of posts of the plurality of rows of posts and a second to last row of posts of the plurality of rows of posts; and
   a second electrode electrically coupled to the collection chamber downstream of the plurality of rows of posts.

* * * * *